United States Patent

Ohama et al.

[11] Patent Number: 6,044,684
[45] Date of Patent: Apr. 4, 2000

[54] FORGING APPARATUS FOR INNER RACE OF CONSTANT VELOCITY UNIVERSAL JOINT

[75] Inventors: Tsukashi Ohama; Tomonori Nakamura, both of Utsunomiya; Junya Saeki, deceased, late of Oyama, by Akiko Saeki, executrix; Mikio Kobayashi, Tochigi-ken, all of Japan

[73] Assignee: Honda Giken Kogyo Kabushiki Kaisha, Tokyo, Japan

[21] Appl. No.: 09/222,678

[22] Filed: Dec. 29, 1998

[51] Int. Cl.$^7$ .................................................. B21D 22/00
[52] U.S. Cl. ............................................ 72/354.2; 72/399
[58] Field of Search .................................. 72/353.4, 358, 72/354.2, 356, 398, 345, 355.6, 350, 402, 399

[56] References Cited

U.S. PATENT DOCUMENTS

| 2,158,312 | 5/1939 | Terrell | 72/353.4 |
| 4,601,191 | 7/1986 | Ikeda et al. | 72/354.2 |
| 4,843,864 | 7/1989 | Welschof | 72/353.4 |
| 5,001,920 | 3/1991 | Ishinaga et al. | 72/353.4 |

FOREIGN PATENT DOCUMENTS

| 57-56132 | 4/1982 | Japan . |
| 63-199040 | 8/1988 | Japan . |

Primary Examiner—Rodney C Butler
Attorney, Agent, or Firm—Birch, Stewart, Kolasch & Birch, LLP

[57] ABSTRACT

A plurality of grooves, which are defined in a reinforcing ring, comprise respective end walls which are formed as inclined surfaces. The grooves further comprise walls on which engaging projections are disposed in parallel to the inclined surfaces respectively. Segmented dies are installed in the grooves. Grooves, which are defined on the segmented dies, slidably engage with the engaging projections respectively. Accordingly, the segmented dies are displaced along the inclined surfaces while being guided by the engaging projections. Thus, it is possible to stably hold the segmented dies on the reinforcing ring. Further, it is possible to simplify the structure of the forging apparatus, and it is possible to decrease the number of parts.

14 Claims, 10 Drawing Sheets

FORGING APPARATUS FOR INNER RACE OF CONSTANT VELOCITY UNIVERSAL JOINT

BACKGROUND OF THE INVENTION

1. Field of the Invention

The present invention relates to a forging apparatus for an inner race of a constant velocity universal joint, which makes it possible to simplify the structure and decrease the number of parts.

2. Description of the Related Art

Conventionally, the inner race of the constant velocity universal joint is formed to have a ring-shaped configuration with its spherical outer circumference. A plurality of ball grooves are formed on the outer circumference. When the inner race of the constant velocity universal joint is produced by means of a forging process, the following procedure is adopted. That is, a material is arranged at the inside of a combined die which is split into two, i.e., an upper die and a lower die, because the inner race of the constant velocity universal joint has an undercut shape over its outer circumference. After that, the upper die and the lower die are clamped to carry out the forging process. However, this method is disadvantageous in that the upper die and the lower die tend to suffer centering deviation, resulting in decrease in accuracy of formation. In addition, a burr appears on a formed product between the upper die and the lower die. Therefore, it is necessary to remove the burr by means of cutting processing. For this reason, a problem arises in that the number of production steps is increased, and the production process requires a long period of time.

As a method for solving such a problem, Japanese Laid-Open Patent Publication No. 63-199040 discloses a press-forming method for an inner race of a constant velocity universal joint (hereinafter referred to as "conventional technique 1"). In this method, a material is placed on a lower punch, and then an upper die is lowered. Accordingly, a plurality of segmented dies are pressed by the upper die, and the segmented dies are displaced along tapered surfaces of a guide ring in a direction to make approach to a central axis of the material. Thus, the respective segmented dies make tight contact with each other. Subsequently, when an upper punch is lowered, the material is formed in conformity with a cavity which is constructed by the lower punch, the upper punch, and the segmented dies. Thus, the inner race of the constant velocity universal joint is obtained.

Japanese Laid-Open Patent Publication No. 57-56132 discloses an apparatus for forming an inner race of a constant velocity universal joint (hereinafter referred to as "conventional technique 2"), comprising a plurality of split dies which are held at the inside of a reinforcing ring by the aid of a tapered base and a die guide. A positioning means presses the plurality of split dies in accordance with the lowering action of a press slide. Accordingly, the split dies approach a central axis of a material in accordance with the guiding action of the tapered base, and a punch, which is disposed over the material, enters the material. Thus, the forging process is carried out.

However, the conventional technique 1 includes no mechanism for positioning the segmented dies in the circumferential direction. For this reason, when the respective segmented dies are allowed to make tight contact with each other, an error may arise concerning the position of the segmented die. There is a fear of decrease in accuracy of formation of the formed inner race of the constant velocity universal joint.

The conventional technique 2 requires the tapered base and the die guide. For this reason, the structure of the apparatus is complicated, and it is also necessary to highly accurately perform the production process and the assembling operation for respective parts. Therefore, a problem arises in that the production cost of the apparatus is expensive. Further, it is also necessary to perform the complicated operation for assembling the split dies to the reinforcing ring together with the tapered base and the die guide.

Figure 9:
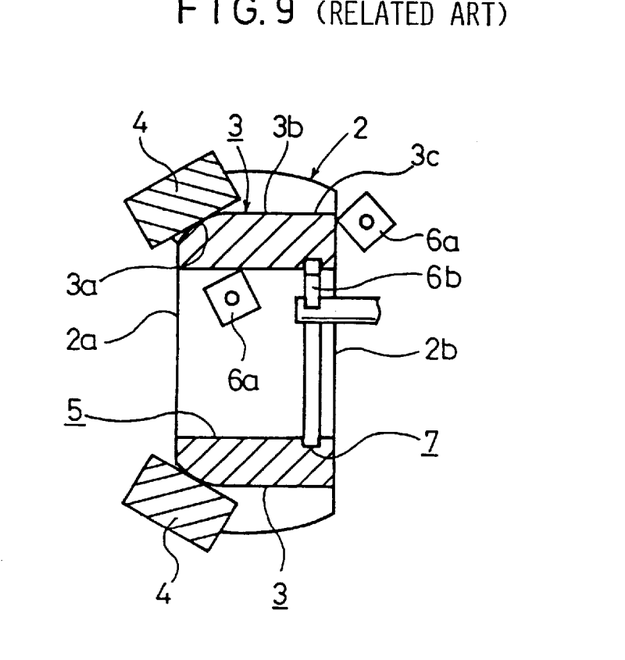
FIG. 9 shows a schematic longitudinal sectional view illustrating a method for producing an inner race of a constant velocity universal joint concerning the conventional technique, depicting a state in which finishing processing is applied to an inner circumferential surface and a large end section.
Figure 10:
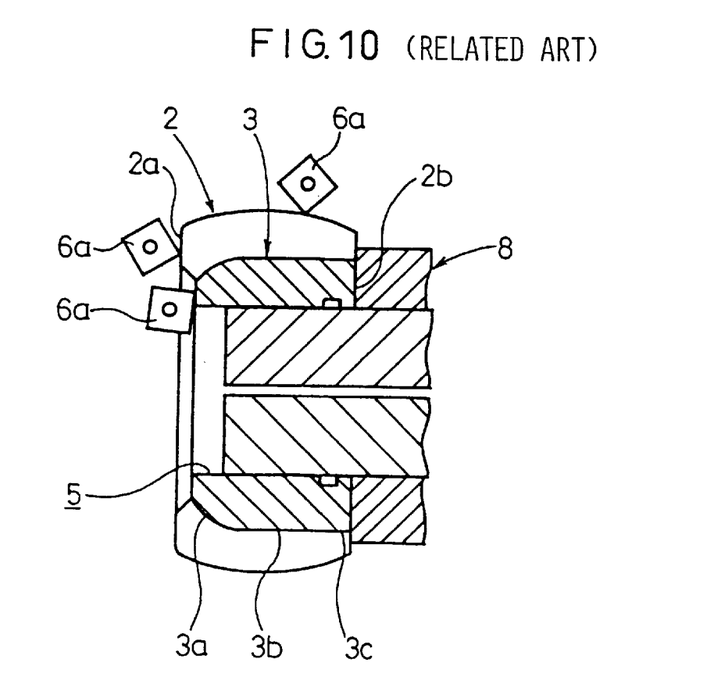
FIG. 10 shows a schematic longitudinal sectional view illustrating the method for producing the inner race of the constant velocity universal joint concerning the conventional technique, depicting a state in which finishing processing and chamfering processing are applied to a small end section.
Figure 11:
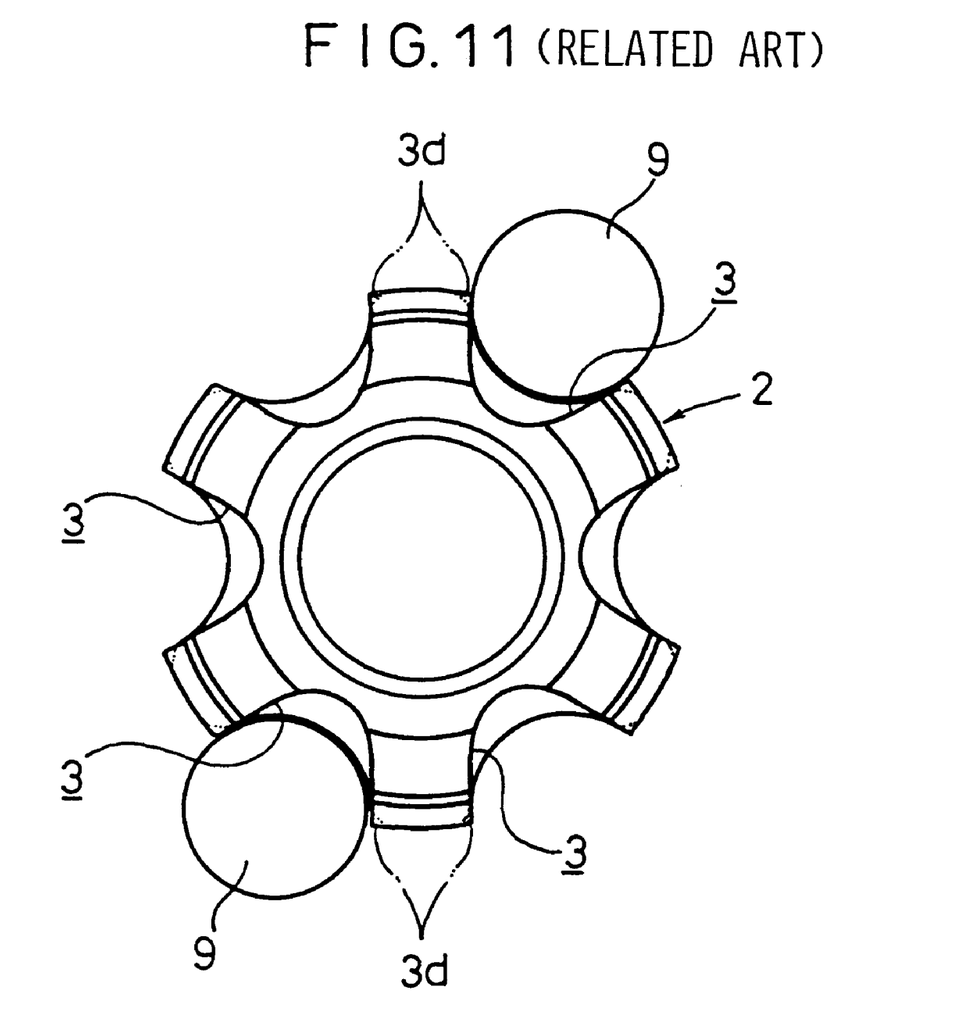
FIG. 11 shows a schematic plan view illustrating the method for producing the inner race of the constant velocity universal joint concerning the conventional technique, depicting a state in which chamfering processing is applied to ball grooves.

On the other hand, it is necessary to apply, in the downstream step, the mechanical processing such as the chamfering processing to the inner race of the constant velocity universal joint formed by the forging process. This procedure is shown in FIGS. 9 to 11. At first, an inner race 2 of a constant velocity universal joint is held by engaging a plurality of dampers 4 on the side of a small end section 2a of a wall for forming ball grooves 3 of the inner race 2 of the constant velocity universal joint (see FIG. 9). Subsequently, a hole 5 is defined at a central portion of the inner race 2 of the constant velocity universal joint by using a drill or the like. A tool 6a installed to an NC processing machine is used to apply finishing processing to a large end section 2b and an inner circumferential surface of the hole 5. A tool 6b is used to define a groove 7 on an inner circumferential surface of the hole 5. Thereafter, a collet damper 8 is inserted into the hole 5 from the side of the large end section 2b to hold the inner race 2 of the constant velocity universal joint (see FIG. 10). The tool 6a of the NC processing machine is used to apply finishing processing, planing processing, and chamfering processing to the small end section 2a. Further, finishing processing is applied to the ball grooves 3. As shown in FIG. 11, a chamfering processing machine equipped with a grinding wheel 9 is used to apply chamfering processing to both sides of each of the plurality of ball grooves 3 to form chamfered sections 3d. As described above, it is necessary to apply the chamfering processing to the respective ball grooves 3, resulting in increase in the number of regions to be processed. Therefore, it takes a long time to carry out the production process. Further, it is necessary to exchange the worn grinding wheel 9, resulting in a problem that the production cost is expensive. Furthermore, the small end section 3a, the back surface section 3b, and the large end section 3c of the ball groove 3 differ in configuration. Therefore, different grinding wheels 9 are required for these sections, resulting in a problem that the production cost is more expensive.

SUMMARY OF THE INVENTION

A general object of the present invention is to provide a forging apparatus for an inner race of a constant velocity universal joint, which makes it possible to stably hold segmented dies on a reinforcing ring by the aid of a guide mechanism, reduce the number of parts, and achieve inexpensive production cost.

A principal object of the present invention is to provide a forging apparatus for an inner race of a constant velocity universal joint, which makes it possible to suppress occurrence of burrs by allowing adjacent segmented dies to make tight contact with each other in accordance with a pressing action effected by a pressing surface of an upper die.

Another object of the present invention is to provide a forging apparatus for an inner race of a constant velocity universal joint, which makes it possible to separate segmented dies from the formed inner race of the constant velocity universal joint by pressing the segmented dies in an axial direction with push pins and displacing the segmented dies along inclined surfaces so that the segmented dies are prevented from interfering with the inner race of the constant velocity universal joint.

Still another object of the present invention is to provide a forging apparatus for an inner race of a constant velocity universal joint, which makes it possible to eliminate any fear of disengagement of segmented dies from a reinforcing ring by providing, at an opening of the reinforcing ring, a stopper for restricting a displacement range of the segmented die.

The above and other objects, features, and advantages of the present invention will become more apparent from the all following description when taken in conjunction with the accompanying drawings in which a preferred embodiment of the present invention is shown by way of illustrative example.

DESCRIPTION OF THE PREFERRED EMBODIMENTS

The forging apparatus for the inner race of the constant velocity universal joint according to the present invention, which is exemplified by a preferred embodiment, will be explained in detail below with reference to the accompanying drawings.

Figure 1:
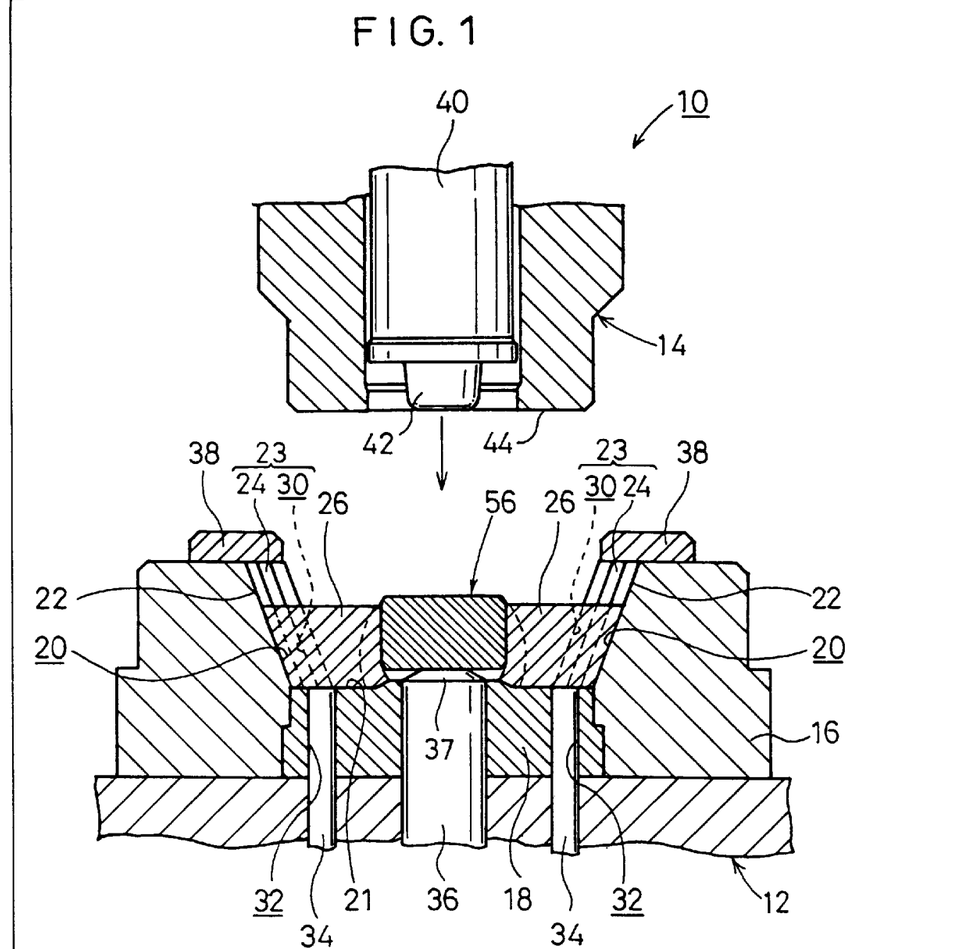
FIG. 1 shows a partial longitudinal sectional view illustrating a forging apparatus for an inner race of a constant velocity universal joint according to an embodiment of the present invention.
Figure 2:
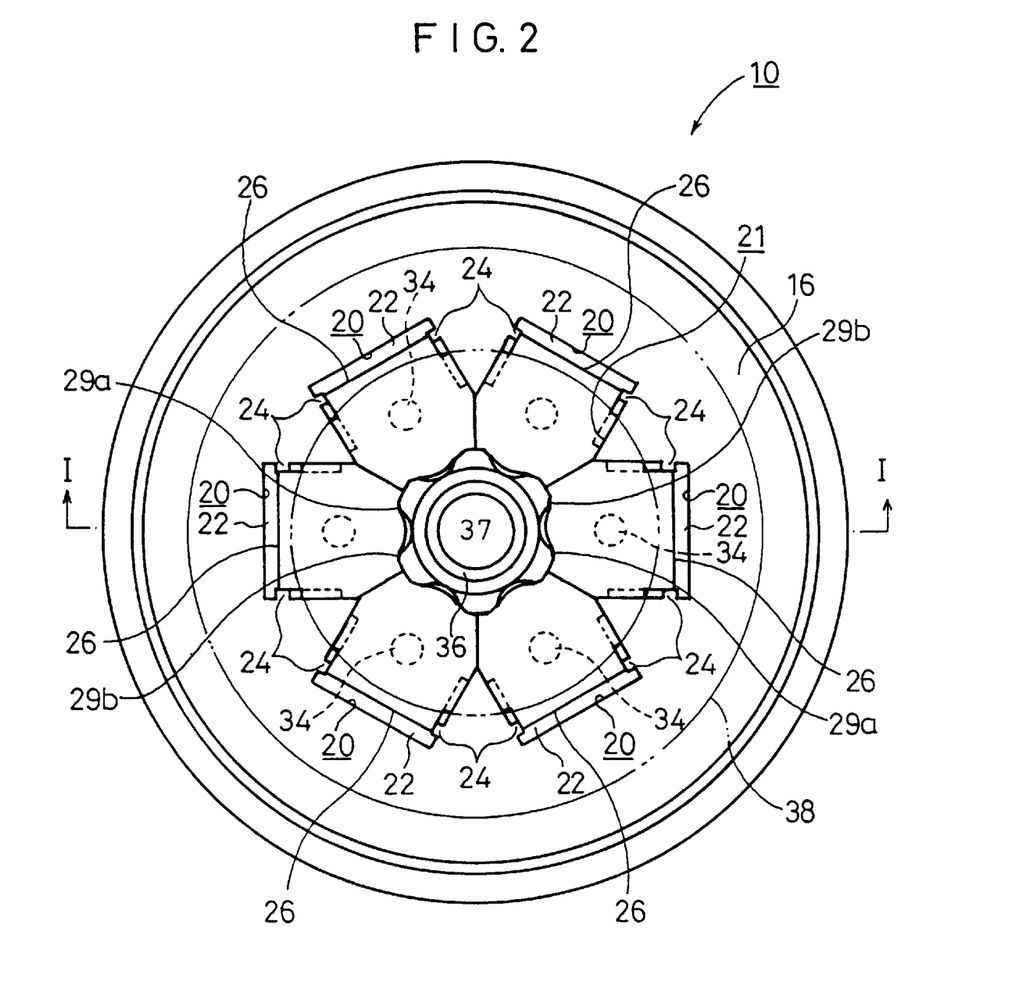
FIG. 2 shows a plan view illustrating the forging apparatus shown in FIG. 1.

With reference to FIG. 1, reference numeral 10 illustrates a forging apparatus for an inner race of a constant velocity universal joint according to an embodiment of the present invention. The forging apparatus 10 comprises a lower die 12, and an upper die 14 which is capable of making approach or separation with respect to the lower die 12. A reinforcing ring 16 is secured onto the lower die 12. A plate 18 is installed on the lower die 12 at the inside of the reinforcing ring 16. As shown in FIG. 2, a recess 21, which comprises six grooves 20 combined in a radial pattern, is defined at the inside of the reinforcing ring 16. A wall, which is disposed on one end side of each of the grooves 20, is formed as an inclined surface 22 which is inclined downwardly toward the center of the reinforcing ring 16 (see FIG. 1). Wall surfaces are formed on both sides of the inclined surface 22. An engaging projection 24 for constructing a guide mechanism 23 is formed on the wall surface to extend in parallel to the inclined surface 22 (see FIG. 3).

Figure 3:
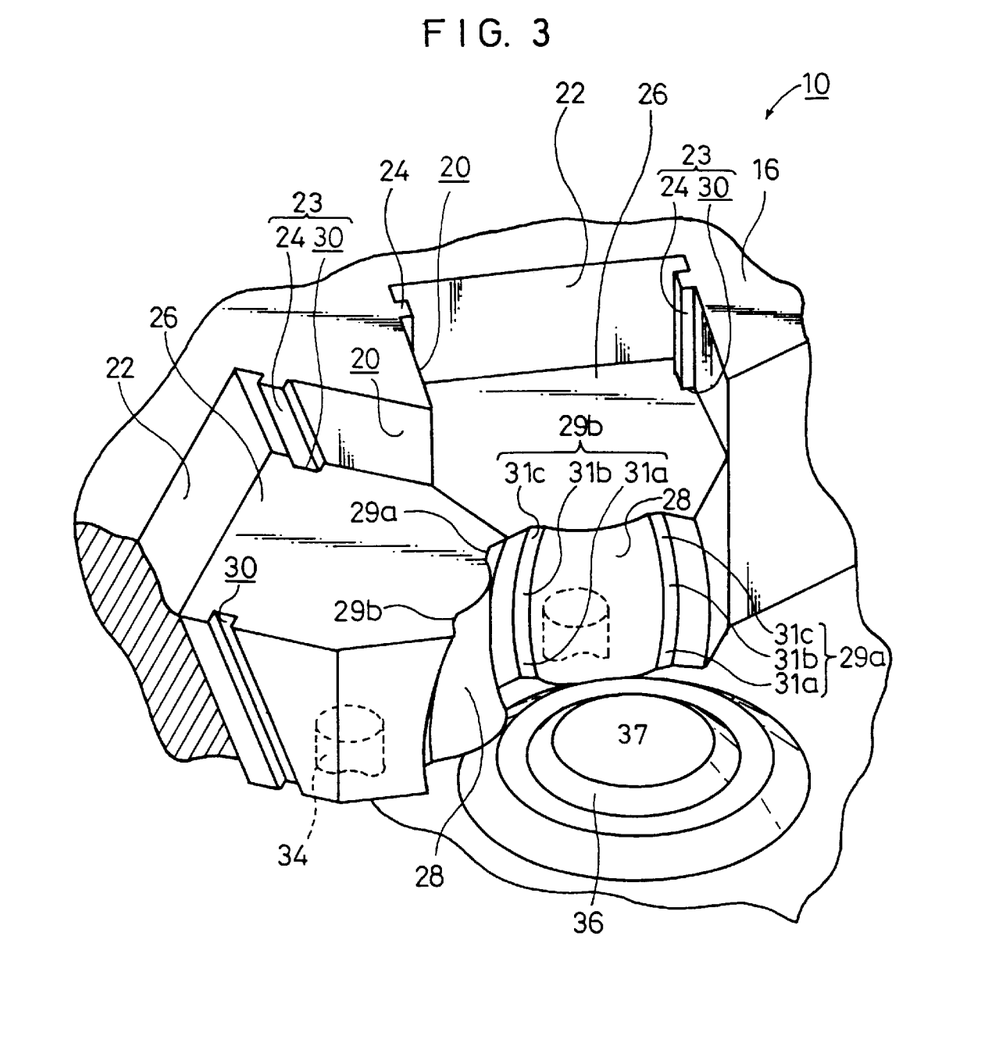
FIG. 3 shows a partial magnified sectional perspective view illustrating segmented dies of the forging apparatus shown in FIG. 1.

Segmented dies 26 are installed in the grooves 20. The segmented dies 26 are arranged in a radial pattern. A die surface 28 is formed on each of the segmented dies 26. Surfacing forging sections 29a, 29b are formed on the die surface 28. Each of the surfacing forging sections 29a, 29b comprises a large end side forging section 31a, a back surface side forging section 31b, and a small end side forging section 31c which are disposed along the axial direction. Grooves 30, which construct the guide mechanisms 23 and which slidably engage with the engaging projections 24 respectively, are defined on both side surfaces of the segmented dies 26.

As shown in FIG. 1, a plurality of holes 32 are defined through the plate 18 corresponding to the segmented dies 26. Push pins 34 are slidably inserted through the holes 32 respectively. The lower portion of the push pin 34 is connected to an unillustrated driving unit. When the driving unit is operated, the push pins 34 are displaced in the upward and downward directions. The upper portion of the push pin 34 is capable of making abutment against the lower surface of the segmented die 26. When the push pins 34 are displaced, the segmented dies 26 are displaced along the inclined surfaces 22 while being guided by the guide mechanisms 23. A lower punch 36 is slidably inserted through a central portion of the plate 18. The punch 36 is displaced in the upward and downward directions by the aid of an unillustrated driving unit. A projection 37, which has its diameter gradually reduced, is formed at the upper end of the lower punch 36 to plastically deform a workpiece.

A ring-shaped stopper 38, which protrudes toward an opening of the reinforcing ring 16, is secured to the upper surface of the reinforcing ring 16. The stopper 38 restricts the range of upward displacement of the segmented dies 26.

The lower portion of the upper die 14 is formed as a pressing surface 44 for pressing the segmented dies 26. An upper punch 40 is slidably inserted through a central portion of the upper die 14. The upper punch 40 is relatively displaceable in the upward and downward directions with respect to the upper die 14 by the aid of an unillustrated driving unit. A projection 42 for plastically deforming the workpiece is formed to protrude at the lower portion of the upper punch 40.

The forging apparatus 10 for the inner race of the constant velocity universal joint according to the embodiment of the present invention is basically constructed as described above. Next, the inner race 50 of the constant velocity universal joint, which is the workpiece to be formed by the forging apparatus 10, will be explained with reference to FIG. 4.

Figure 4:
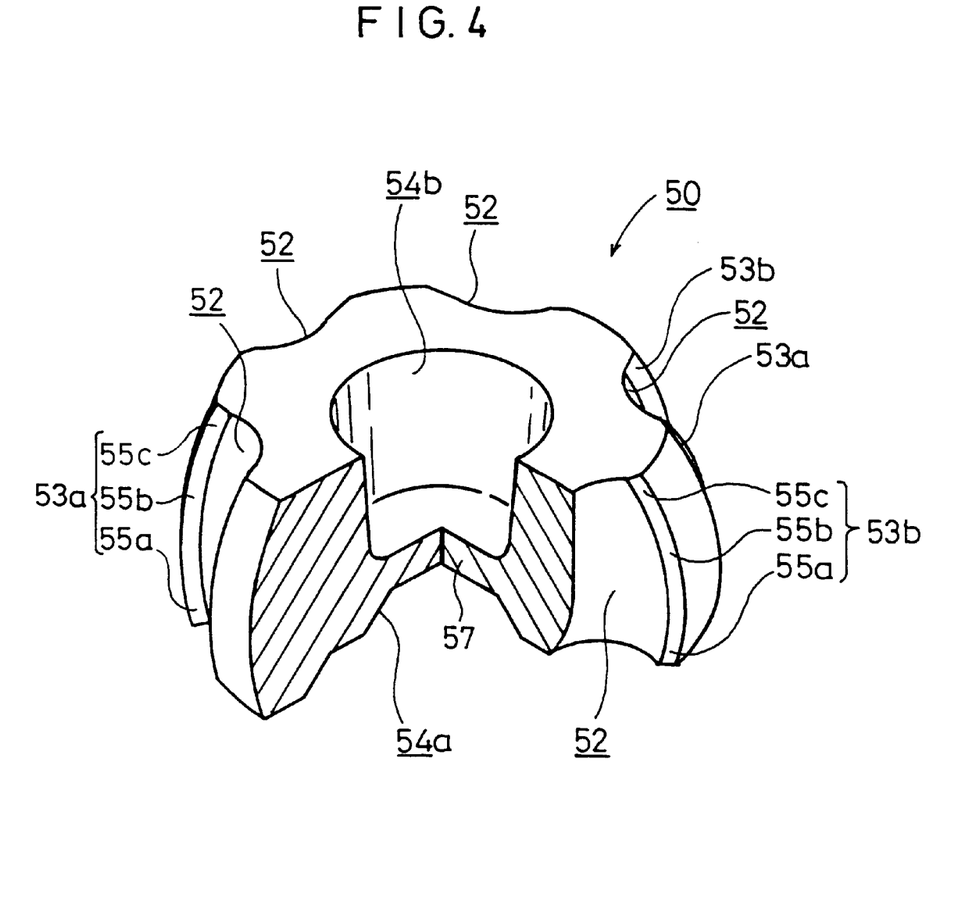
FIG. 4 shows a partial sectional perspective view illustrating the inner race of the constant velocity universal joint formed by using the forging apparatus shown in FIG. 1.

A plurality of ball grooves 52, which are curved along the axial direction of the inner race 50 of the constant velocity universal joint, are defined on the outer circumference of the inner race 50 of the constant velocity universal joint. A wall, which is defined between the adjacent ball grooves 52, is formed to have a substantially spherical configuration. Surfaced sections 53a, 53b are formed on both sides of each of the ball grooves 52. Each of the surfaced sections 53a, 53b comprises a large end section 55a, a back surface section 55b, and a small end section 55c which are formed along the longitudinal m direction of the ball groove 52. Recesses 54a, 54b are defined along the axial direction at the center of the inner race 50 of the constant velocity universal joint. A wall 57 is formed between the recesses 54a, 54b.

Next, the operation of the forging apparatus 10 will be explained.

At first, when the push pins 34 are lowered, the segmented dies 26, which are placed on the push pins 34, are displaced along the inclined surfaces 22 at the inside of the reinforcing ring 16 in accordance with the guiding action of the engaging projections 24 and the grooves 30 which construct the guide mechanisms 23. Accordingly, the segmented dies 26 are placed on the plate 18. The respective segmented dies 26 mutually contact with the adjacent segmented dies 26 (see FIGS. 1 and 2). As described above, the segmented dies 26 are guided by the engaging projections 24 and the grooves 30. Therefore, the segmented dies 26 are stably held by the reinforcing ring 16, and they are positioned highly accurately.

Subsequently, a material 56, which is prepared to have a substantially cylindrical configuration, is placed on the lower punch 36 of the forging apparatus 10.

Figure 5:
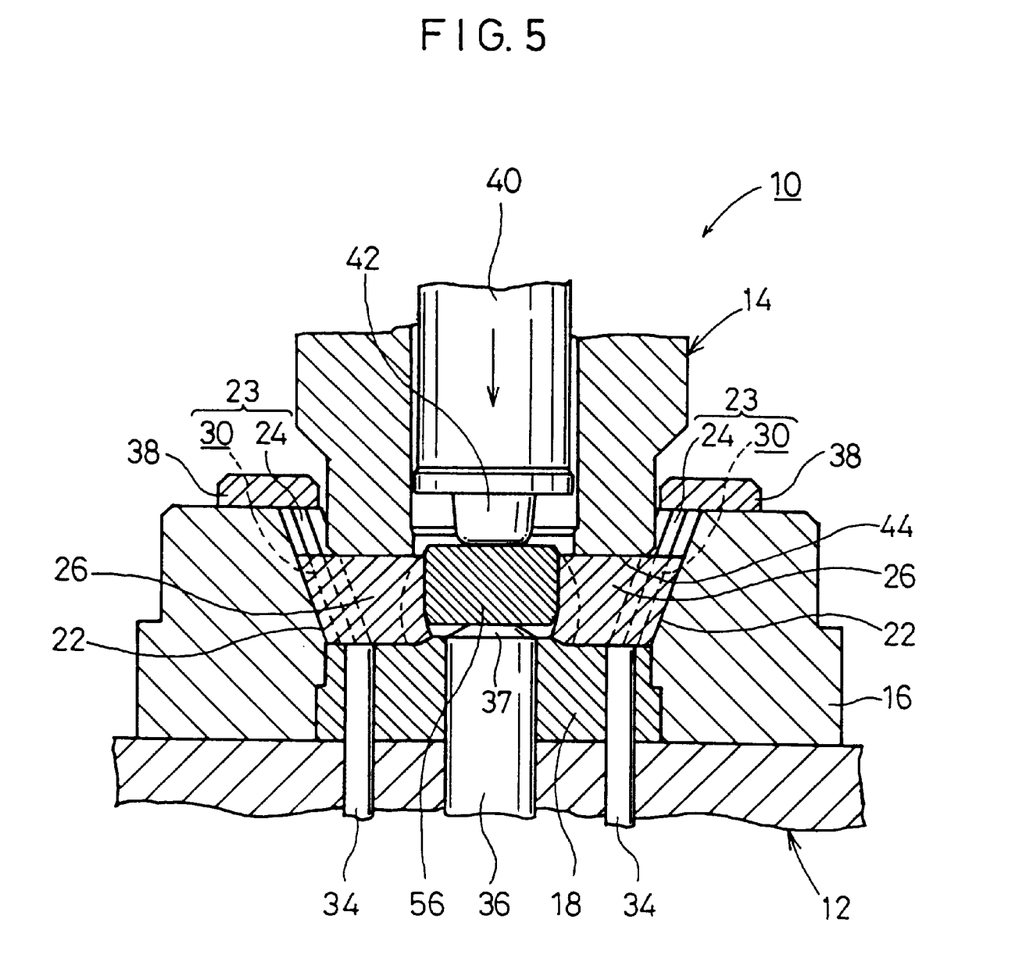
FIG. 5 shows a partial longitudinal sectional view illustrating a method for using the forging apparatus shown in FIG. 1, depicting a state in which an upper die presses the segmented dies.

Subsequently, when the upper die 14 is lowered, the pressing surface 44 of the upper die 14 abuts against the upper surfaces of the segmented dies 26 to press the segmented dies 26 in the downward direction (see FIG. 5). Accordingly, the segmented dies 26 are guided by the engaging projections 24, and they are pressed toward the central axis of the material 56 along the inclined surfaces 22. The respective segmented dies 26 mutually make tight contact with the adjacent segmented dies 26.

Figure 6:
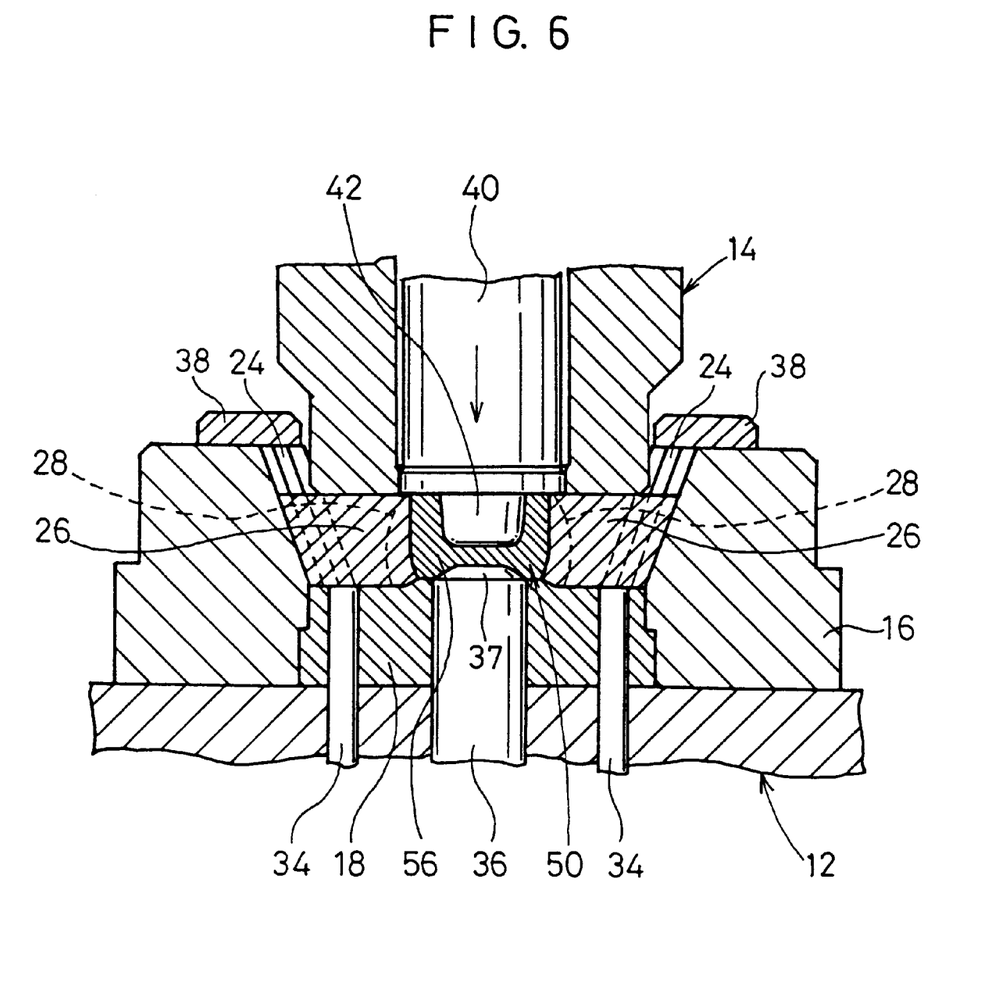
FIG. 6 shows a partial longitudinal sectional view illustrating the method for using the forging apparatus shown in FIG. 1, depicting a state in which an upper punch enters a material.

Subsequently, as shown in FIG. 6, the upper punch 40 is lowered. The projections 37, 42 of the lower punch 36 and the upper punch 40 enter the material 56, and ingredients of the material 56 cause plastic flow radially outwardly. Accordingly, the material 56 is deformed along the die surfaces 28 of the segmented dies 26. The ball grooves 52 are formed, and thus the inner race 50 of the constant velocity universal joint 50 is formed. During this process, the respective segmented dies 26 make tight contact with each other in accordance with the pressing action of the upper die 14. The segmented dies 26 also make tight contact with the plate 18. Therefore, there is no fear of occurrence of any burr on the inner race 50 of the constant velocity universal joint. Further, the accuracy of formation of the formed inner race 50 of the constant velocity universal joint is improved, because the segmented dies 26 are stably held by the engaging projections 24 and the grooves 30.

Further, the surfaced sections 53a, 53b are formed on the both sides of the ball grooves 52 of the inner race 50 of the constant velocity universal joint by means of the surfacing forging sections 29a, 29b of the segmented dies 26 (see FIGS. 3 and 4). In this embodiment, the large end section 55a is formed by the large end side forging section 31a, the back surface section 55b is formed by the back surface side forging section 31b, and the small end section 55c is formed by the small end side forging section 55c. The surfaced sections 53a, 53b are formed by the forging process as described above. Therefore, it is unnecessary to perform any machining processing such as chamfering processing which would be otherwise performed in the downstream step.

Figure 7:
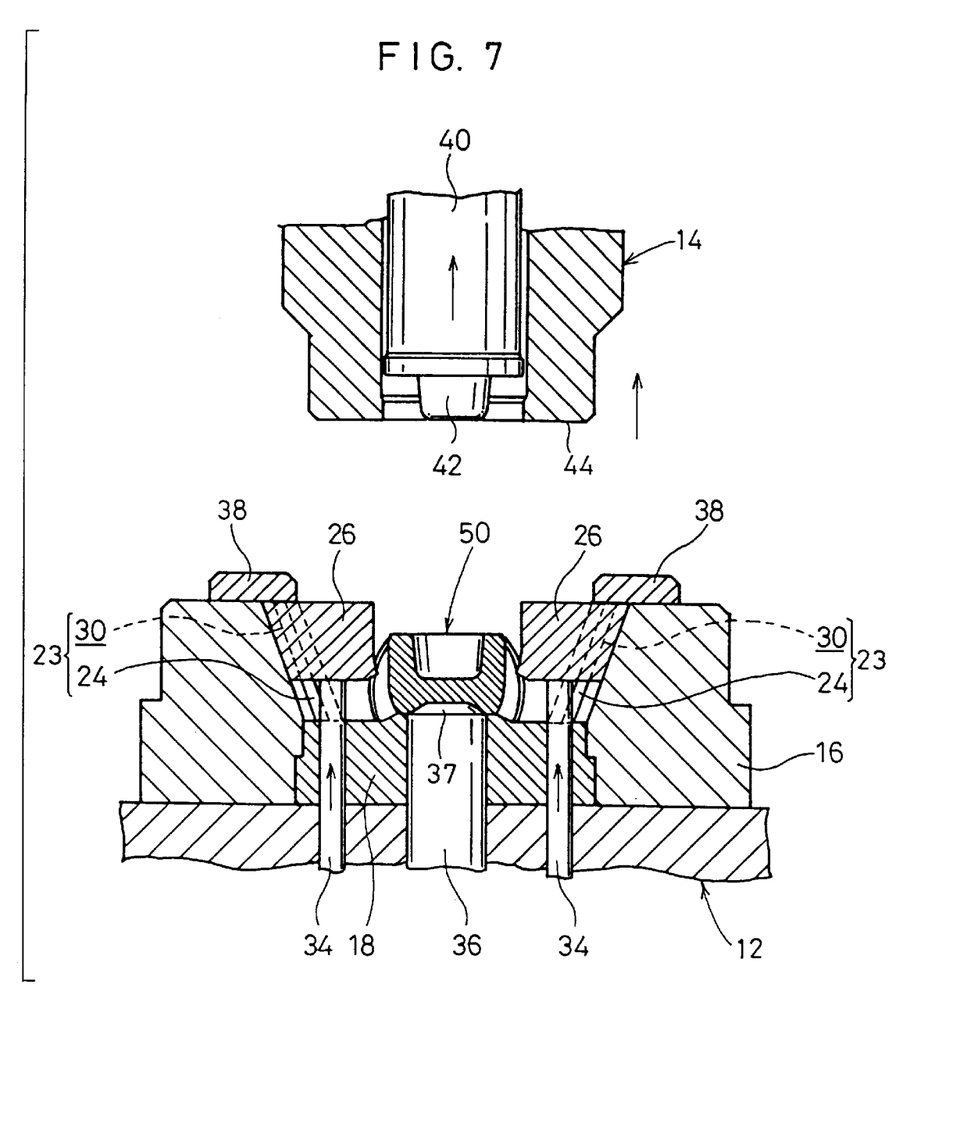
FIG. 7 shows a partial longitudinal sectional view illustrating the method for using the forging apparatus shown in FIG. 1, depicting a state in which the segmented dies are opened.

Subsequently, the upper die 14 and the upper punch 40 are raised (see FIG. 7). The push pins 34 are raised, and the segmented dies 26 are displaced along the inclined surfaces 22 in accordance with the guiding action of the engaging projections 24 and the grooves 30. The segmented dies 26 are separated from the formed inner race 50 of the constant velocity universal joint so that the dies are opened without any interference between the segmented dies 26 and the inner race 50 of the constant velocity universal joint. Accordingly, the surface of the inner race 50 of the constant velocity universal joint is not damaged by the segmented dies 26. The upper portions of the segmented dies 26 abut against the stopper 38, and their displacement ranges are restricted. Accordingly, the segmented dies 26 are not disengaged from the reinforcing ring 16.

Figure 8:
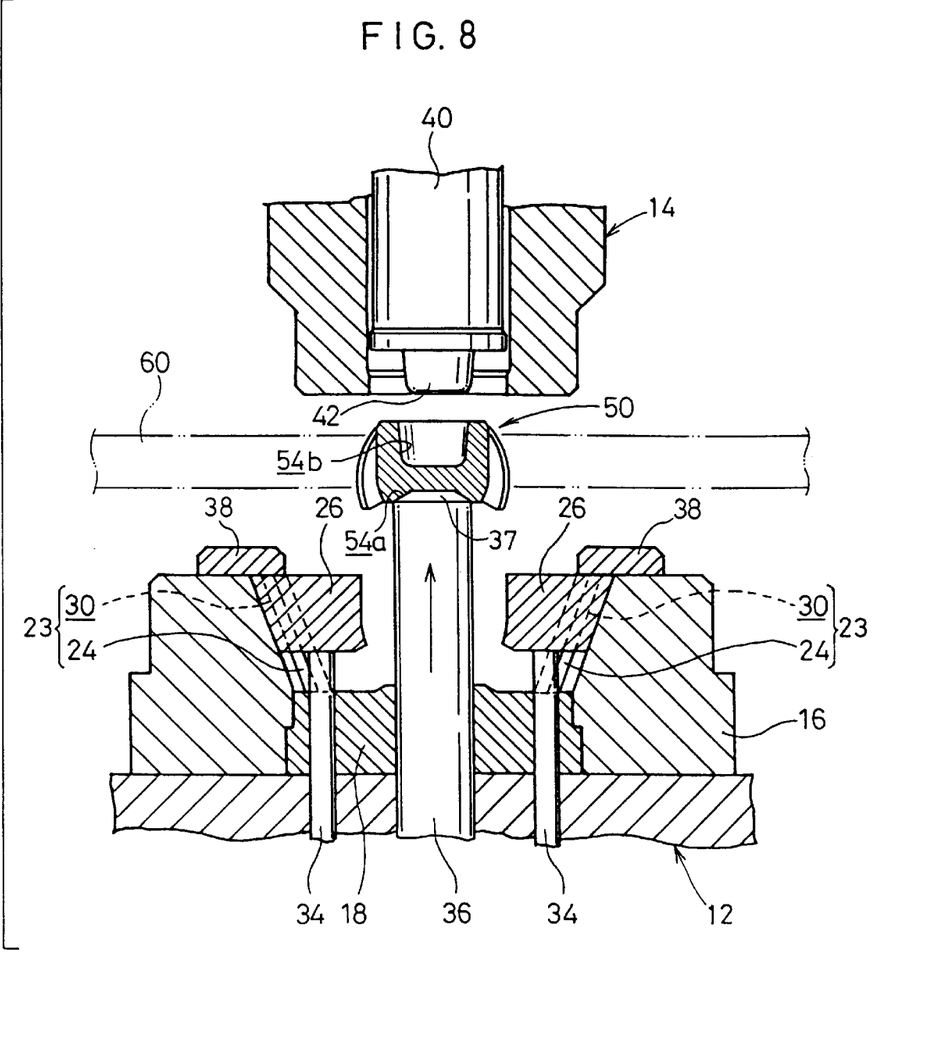
FIG. 8 shows a partial longitudinal sectional view illustrating the method for using the forging apparatus shown in FIG. 1, depicting a state in which the inner race of the constant velocity universal joint is taken out.

After that, as shown in FIG. 8, the lower punch 36 is raised, and the inner race 50 of the constant velocity universal joint is taken out in a state in which the projection 37 is engaged with the recess 54a. The inner race 50 of the constant velocity universal joint is transported to the next step by the aid of a transfer feed bar 60.

The inner race 50 of the constant velocity universal joint is forged as described above.

The forging apparatus 10 for the inner race 50 of the constant velocity universal joint according to the embodiment of the present invention is constructed such that the engaging projections 24 are disposed on the reinforcing ring 16, and the grooves 30 for engaging with the engaging projections 24 are disposed on the segmented dies 26. However, it is also allowable that the grooves 30 are disposed on the reinforcing ring 16, and the engaging projections 24 are disposed on the segmented dies 26.

The forging apparatus 10 for the inner race 50 of the constant velocity universal joint according to the embodiment of the present invention provides the following effects and advantages.

The segmented dies 26 can be stably held by the reinforcing ring 16, because the segmented dies 26 are displaced along the inclined surfaces 22 of the reinforcing ring 16 while being guided by the guide mechanisms 23. The adjacent segmented dies 26 make tight contact with each other in accordance with the pressing action of the upper die 14. Accordingly, it is possible to suppress the occurrence of burrs, and it is possible to improve the dimensional accuracy of the inner race 50 of the constant velocity universal joint. The provision of the stopper 38 for restricting the displacement ranges of the segmented dies 26 prevents the segmented dies 26 from disengagement from the reinforcing ring 16. Accordingly, it is possible to maintain the accuracy of formation by holding the segmented dies 26 at the predetermined positions.

Further, it is possible to decrease the number of parts for constructing the forging apparatus 10, and it is possible to assemble the forging apparatus 10 highly accurately. Accordingly, it is possible to further improve the dimensional accuracy of the inner race 50 of the constant velocity universal joint. Furthermore, the operation to assemble the forging apparatus 10 is simplified. Accordingly, it is possible to reduce the production cost for the forging apparatus 10. Moreover, the series of the large end section 55a, the back surface section 55b, and the small end section 55c of the surfaced section 53a, 53b are formed by the forging process on the both sides of the ball groove 52 of the inner race 50 of the constant velocity universal joint. Accordingly, it is unnecessary to perform the step of chamfering processing and prepare an apparatus therefor. Thus, the period of time required to produce the inner race 50 is shortened, the production efficiency is improved, and the price of the production apparatus is inexpensive.

What is claimed is:

1. A forging apparatus for an inner race of a constant velocity universal joint, comprising a lower punch which is disposed on a side of a lower die and which is displaceable in an axial direction of a material, an upper punch which is disposed on a side of an upper die and which is displaceable in said axial direction of said material, and a plurality of segmented dies each of which is displaceable in a direction directed from an outer circumference to a central axis of said material and each of which has a die surface corresponding to a ball groove of said inner race of said constant velocity universal joint, to forge said material, said forging apparatus further comprising:

a reinforcing ring which is disposed on said lower die and which has inclined surfaces inclined in directions to make approach or separation with respect to said central axis of said material respectively for allowing said segmented dies to slide thereon;

guide mechanisms each of which includes an engaging projection and a groove extending in parallel to said inclined surface, any one of said engaging projection and said groove being disposed on said segmented die, and the other being disposed on said reinforcing ring; and push pins for pushing said segmented dies in an axial direction so that said segmented dies are displaced along said inclined surfaces to be separated from said formed inner race of said constant velocity joint, wherein said segmented dies make displacement along said inclined surface in accordance with a guiding action of said guide mechanisms so that said plurality of segmented dies make approach or separation with respect to one another.

2. The forging apparatus for said inner race of said constant velocity universal joint according to claim 1, wherein said upper die comprises a pressing surface for pressing said plurality of segmented dies, and said segmented dies make displacement along said guide mechanisms in accordance with a pressing action of said upper die during a forging process so that said segmented dies mutually make tight contact with adjacent segmented dies.

3. The forging apparatus for said inner race of said constant velocity universal joint according to claim 1, wherein each of said segmented dies comprises surfacing forging sections formed on said die surface corresponding to said ball groove, and surfaced sections are formed on both sides of said ball groove by using said surfacing forging sections during a forging process.

4. The forging apparatus for said inner race of said constant velocity universal joint according to claim 1, wherein said reinforcing ring is provided, around its opening, with a stopper for restricting a displacement range of each of said segmented dies.

5. The forging apparatus for said inner race of said constant velocity universal joint according to claim 1, wherein said lower punch and said upper punch are provided with projections for entering said material to deform said material.

6. The forging apparatus for said inner race of said constant velocity universal joint according to claim 1, wherein each of said push pins is provided for each of said plurality of segmented dies, said push pin capable of making abutment against a lower surface of each of said segmented dies by displacing in the axial direction.

7. The forging apparatus for said inner race of said constant velocity universal joint according to claim 3, wherein each of said surfacing forging sections includes a large end side forging section, a back surface side forging section, and a small end side forging section, and a large end section, a back surface section, and a small end section are formed on each of said surfaced sections by using said large end side forging section, said back surface side forging section, and said small end side forging section during said forging process.

8. A forging apparatus for an inner race of a constant velocity universal joint, comprising a lower punch which is disposed on a side of a lower die and which is displaceable in an axial direction of a material, an upper punch which is disposed on a side of an upper die and which is displaceable in said axial direction of said material, and a plurality of segmented dies each of which is displaceable in a direction directed from an outer circumference to a central axis of said material and each of which has a die surface corresponding to a ball groove of said inner race of said constant velocity universal joint, to forge said material, said forging apparatus further comprising:

a reinforcing ring which is disposed on said lower die and which has inclined surfaces inclined in directions to make approach or separation with respect to said central axis of said material respectively for allowing said segmented dies to slide thereon; and     guide mechanisms each of which includes an engaging projection and a groove extending in parallel to said inclined surface, any one of said engaging projection and said groove being disposed on said segmented die, and the other being disposed on said reinforcing ring, said one of said engaging projection and said groove which is disposed on said segmented die extending along a face of said segmented die from an upper side to a lower side of said segmented die, and said other which is disposed on said reinforcing ring being substantially equal in length to said inclined surface, wherein said segmented dies make displacement along said inclined surface in accordance with a guiding action of said guide mechanisms so that said plurality of segmented dies make approach or separation with respect to one another.

9. The forging apparatus for said inner race of said constant velocity universal joint according to claim 8, wherein said upper die comprises a pressing surface for pressing said plurality of segmented dies, and said segmented dies make displacement along said guide mechanism in accordance with a pressing action of said upper die during a forging process so that said segmented dies mutually make tight contact with adjacent segmented dies.

10. The forging apparatus for said inner race of said constant velocity universal joint according to claim 8, further comprising push pins for pushing said segmented dies in an axial direction so that said segmented dies are displaced along said inclined surfaces to be separated from said formed inner race of said constant velocity universal joint.

11. The forging apparatus for said inner race of said constant velocity universal joint according to claim 8, wherein each of said segmented dies comprises surfacing forging sections formed on said die surface corresponding to said ball groove, and surfaced sections are formed on both sides of said ball groove by using said surfacing forging sections during a forging process.

12. The forging apparatus for said inner race of said constant velocity universal joint according to claim 8, wherein said reinforcing ring is provided, around its opening, with a stopper for restricting a displacement range of each of said segmented dies.

13. The forging apparatus for said inner race of said constant velocity universal joint according to claim 8, wherein said lower punch and said upper punch are provided with projections for entering said material to deform said material.

14. The forging apparatus for said inner race of said constant velocity universal joint according to claim 11, wherein each of said surfacing forging sections includes a large end side forging section, a back surface side forging section, and a small end side forging section, and a large end section, a back surface section, and a small end section are formed on each of said surfaced sections by using said large end side forging section, said back surface side forging section, and said small end side forging section during said forging process.

\* \* \* \* \*